United States Patent [19]

Sutz

[11] 4,211,126
[45] Jul. 8, 1980

[54] WIND MACHINE SYSTEM FOR PUSHING AND LIFTING LOADS AND HAVING IMPROVED COUNTERBALANCING

[76] Inventor: Richard K. Sutz, 19359 Dunbridge Way, Gaithersburg, Md. 20760

[21] Appl. No.: 919,763

[22] Filed: Jun. 28, 1978

[51] Int. Cl.$^2$ .................. F03D 11/00; F04B 17/02
[52] U.S. Cl. ........................... 74/590; 74/381; 60/398; 417/334
[58] Field of Search ............... 60/398; 74/381, 589, 74/590; 248/324, 325, 346, 346.1; 417/334

[56] References Cited

U.S. PATENT DOCUMENTS

| | | | |
|---|---|---|---|
| 914,385 | 3/1909 | Cotten | 74/590 X |
| 3,782,222 | 1/1974 | Berggren | 74/590 |

*Primary Examiner*—Edgar W. Geoghegan

[57] ABSTRACT

A wind machine has a tower frame formed by four converging beams. At the top of the tower is a gear head connected to a wind driven rotatable multibladed rotor. Connected to the gear head is a vertical shaft which is reciprocated vertically as the rotor rotates. Bearings above and below the gear head enable the gear head to drive the shaft in both downward pushing and upward pulling modes. The system includes a counterbalance assembly having tubular arms at opposite sides of the vertical shaft. The arms are slidably carried by sleeves pivoting in vertical planes on stationary pillow blocks secured to the tower frame. Inner ends of the arms are connected to the vertical shaft. Weights inside the arms are adjustably positioned on threaded rods, and both rods and weights can be locked in place for adjusting the counterbalancing effect of the assembly with respect to the vertical shaft and load. The system can operate at wind speeds ranging upwardly from approximately 3 miles per hour and can operate to drive loads in both downward pushing and upward lifting modes.

10 Claims, 6 Drawing Figures

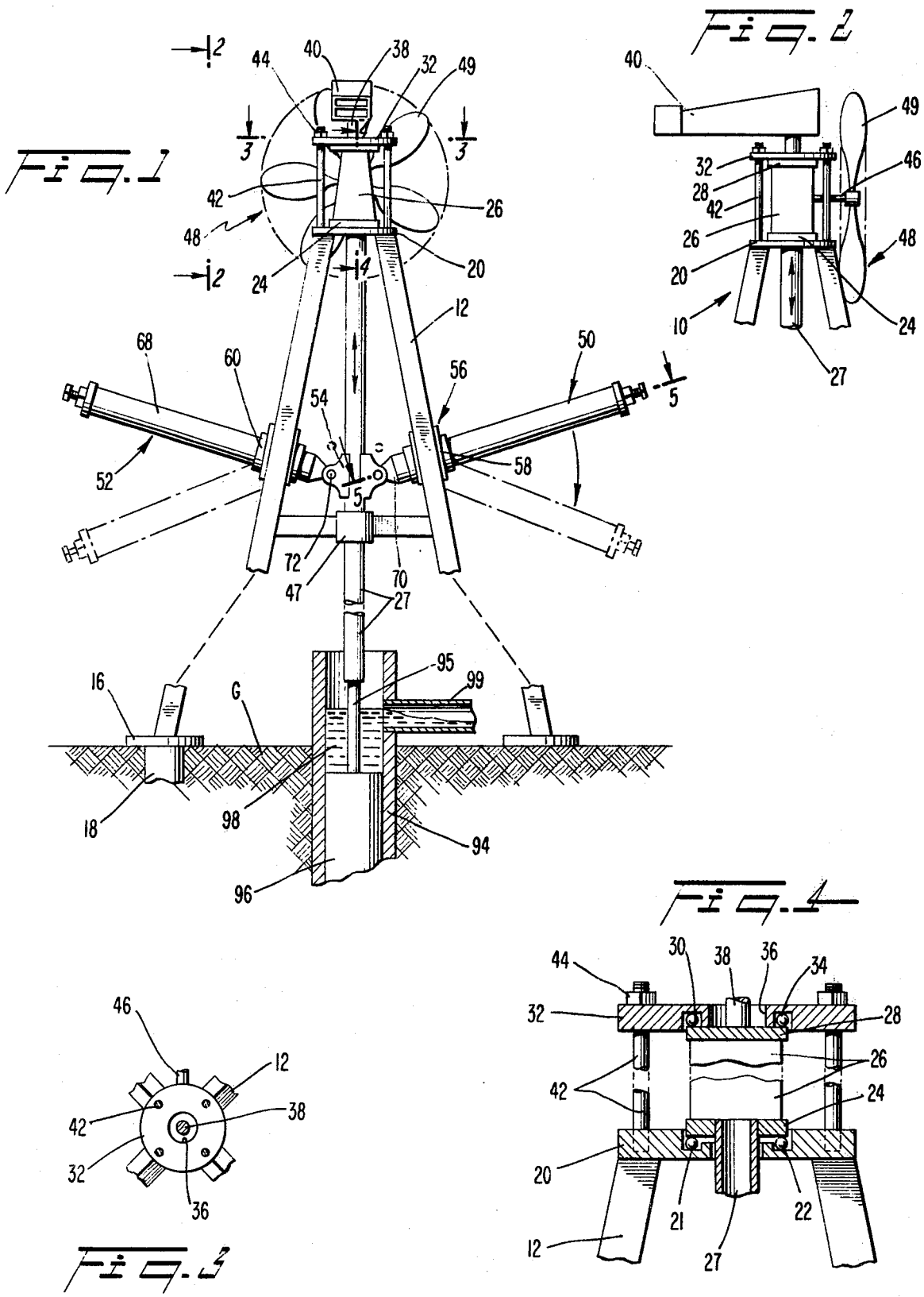

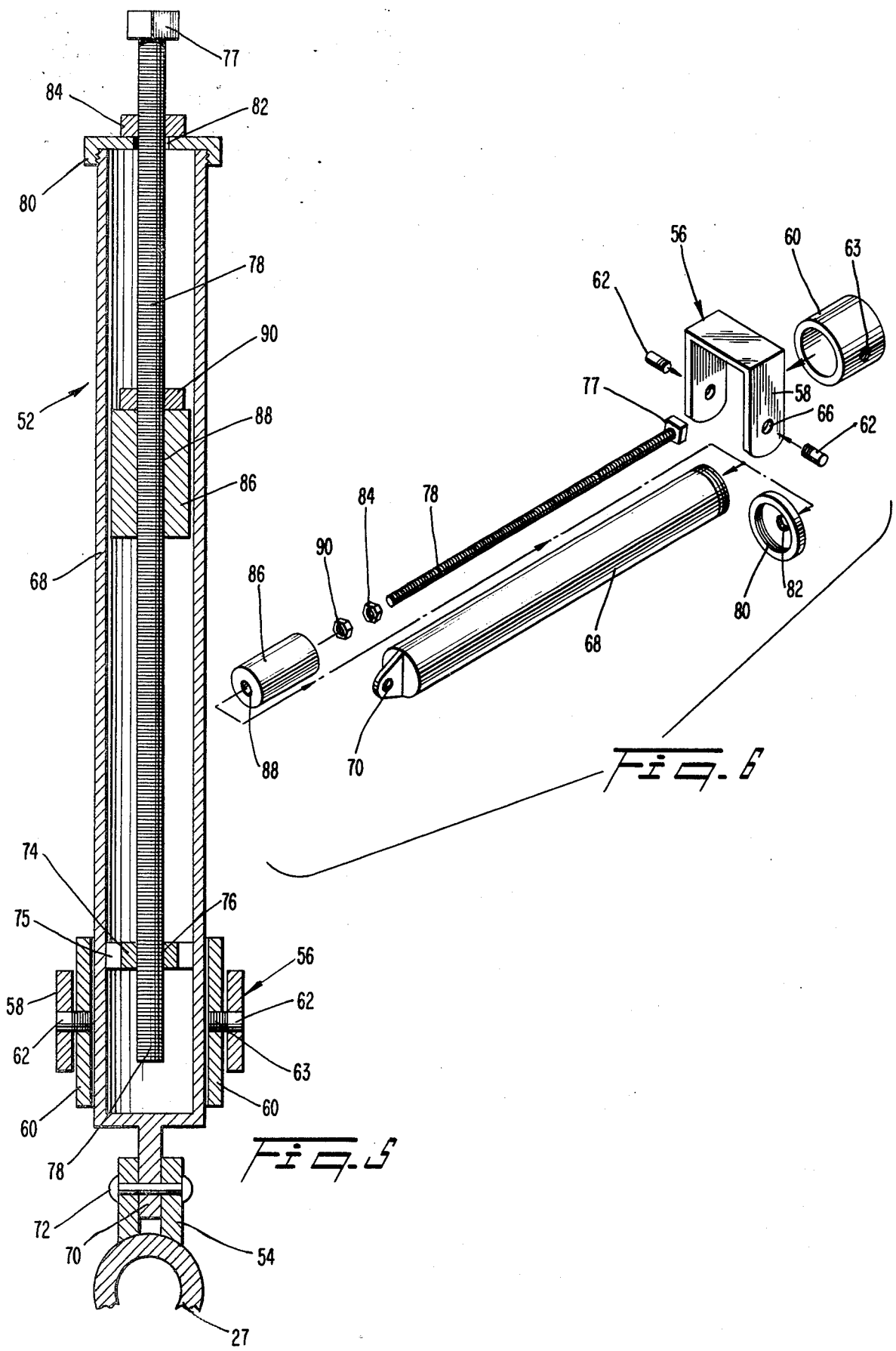

WIND MACHINE SYSTEM FOR PUSHING AND LIFTING LOADS AND HAVING IMPROVED COUNTERBALANCING

BACKGROUND OF THE INVENTION

This invention relates to the art of windmills and wind machines in which a multiblade fan or rotor drives a transmission that converts rotary motion to reciprocation motion to raise and lower a vertical rod driving a water pump or other load. In this type of wind machine, the rotor and transmission are mounted on a high tower and lift the rod, pump cylinder and water only on the up stroke of the rod. On the down stroke the water does not move, but the rod and pump cylinder move down. Thus useful work is done only on the upward or lift stroke. The load is not driven on the down stroke.

Conventional windmills suffer a major limitation in that they do not operate at wind velocities below 15 miles per hour. Since wind velocities equal to or greater than 15 miles per hour occur over the earth's surface only about 30% of the time, the windmills are effective less than one-third of the time, even though their use may be required 100% of the time. When the wind falls below 15 miles per hour momentarily, the momentum of the rotor is usually insufficient to drive the rotor around until sufficient wind velocity returns, so that the rotor stops and may require wind velocity greater than 15 miles per hour to start it again. If such a high velocity wind gust does not occur the windmill remains inactive.

Attempts have been made heretofore to improve the lifting ability of the multiblade, pumping type of windmill by counterbalancing the weight of the lift rod and water by using pulleys and weights. These have not proven practical and reliable in operation. Another proposed counterbalancing arrangement has been proposed in U.S. Pat. No. 3,782,222, issued Jan. 1, 1974. This patent describes a counterbalancing assembly in which telescopic arms extend outwardly from opposite sides of a vertically reciprocating lift rod in a windmill. The arms are secured pivotally to rotatable discs carried by the windmill tower. Each disc has a flexible cable connected between the reciprocating vertical rod and disc to counterbalance the weight of the rod. The arms have telescopic sections which can be extended or retracted to vary the arm's length and thereby to adjust the leverage exerted by the assembly on the rod. This type of counterbalance assembly is generally capable of counterbalancing about 98% of the weight of the reciprocating rod and extends the operability of a windmill in which it is installed to wind velocities as low as 3 miles per hour. In theory, this type of counterbalance system should be adjustable to counterbalance the weight of the rod and at least part of the weight of liquid being pumped to assist the rotor during the lifting part of the cycle. However, when the rod is being lowered, the rotor must provide power to raise the heavy telescopic arms. Conventional windmills are not designed to push a load during the down part of the cycle. If they are required to push down a rod and attached pump cylinder, the transmission comes away from or lifts off its mounting on the tower, the gearing jams, and the windmill becomes inoperative. Difficult and time consuming repairs may then be necessary to repair the windmill to get it operating again. This inability of conventional windmills to pump or push on the down part of the cycle of operation is characteristic of all the more than 6,000,000 windmills heretofore erected. That is why windmills are used only for lifting loads, not for pushing them down. Thus the counterbalance system employing telescopic arms, rotating discs and connecting cables, in practice, cannot be used to assist in lifting the water being pumped, and is limited to assisting in lifting the rod and pump cylinder alone. This counterbalance system having telescopic arms has a number of further limitations which limit its general use. One is the difficulty or impossibility of accurate adjustment in the field of the lengths of the telescopic arms to insure that they are both equal in length and precisely set so as to counterbalance only the weight of the rod and pump cylinder and not more than this weight. Otherwise the transmission motion is opposed, the telescopic arms flap and the connecting cables break. If less than the weight of the rod and cylinder is counterbalanced, the effectiveness of counterbalancing is reduced and the windmill cannot operate efficiently at low wind velocities. Furthermore, the setting of the telescopic arms frequently comes out of adjustment because holding screws loosen and the arm sections slide with respect to each other, so that the arm lengths must be reset. When this occurs during windmill operation, the windmill stops operating or must be stopped, and difficult field adjustments of the telescopic arms must be made. This is often a time consuming operation, during which the windmill cannot operate.

SUMMARY OF THE INVENTION

The present invention is directed at overcoming the above and other difficulties and disadvantages encountered with known types of windmills and their counterbalance systems. The present invention provides windmills or wind machines with capabilities to deliver power to operate both in the upward lifting part of the cycle and in the downward pushing part of the cycle. Thus it becomes practical for the first time to extend the usefullness of wind machines to other applications such as driving air compressors, running head pumps, etc. For the first time it becomes possible to construct a windmill or wind machine which can push down as well as lift up. Furthermore the wind machines can be used at all wind velocities ranging upward from approximately 3 miles per hour. According to the invention the transmission which may be a gear head or gear housing is mounted on the windmill tower between upper and lower bearings which render the wind machine capable of pushing down as well as pulling up in cooperation with the associated, integrated counterbalance system. Conventional rods used in windmills are solid members of narrow diameter, made of wood or of steel $\frac{1}{4}''$ to $\frac{3}{4}''$ diameter. These solid members of narrow diameter cannot be used for pushing loads because they will bend or break under a pushing load. In the present invention, the vertical reciprocating member has the form of a rigid tube or hollow, tubular shaft of wide diameter (for example 3" to 4") so that the wind machine can be used to push down a load as well as lift it up at speeds of 20 cycles per second or more. The tower is constructed of square tubing or beams of square cross section which are strong enough to withstand the large pushing and lifting forces the wind machine is capable of exerting. Also the tower is solidly anchored in the ground to enable the machine to push down as well as lift up. A new and improved counterbalance assembly is provided which can be integrated with the wind machine structure. It is directly coupled to the vertical reciprocating tube or shaft. Field adjustments are minimized or eliminated since they can be done at the factory. Adjustments can be readily performed without requiring the precision of the prior patented counterbalance system above mentioned. The new counterbalance assembly has two rigid tubular arms in each of which is an axially extending rod carrying a cylindrical weight. The rod is threaded and the weight can be moved along the rod and locked in place. Each tubular arm is slidably mounted in a sleeve bearing which is pivotably secured to a stationary pillow block. The block is secured to the tower frame. The inner free ends of the arms are directly and pivotally attached to the vertical reciprocating tube or tubular shaft, so that the arms oscillate axially while turning in vertical arcs around the pivoting sleeves in the pillow blocks. The counterbalance structure is simpler than those of prior counterbalance systems and requires less parts and less adjustments. By the present invention, when the parameters of well depth, cylinder size and vertical shaft weight are known, the internal weights of the arms can be set at the factory to obtain optimum performance in the field. This will eliminate all hit-or-miss field adjustments. The new system will counterbalance the weight of the reciprocating shaft and an optimum portion of the weight of liquid being pumped. Furthermore the wind machine can be used for other purposes than pumping liquids, such as driving an air compressor, heat pump, or other load requiring both pushing and pulling. This invention makes it possible to exploit fully the potentials of wind power at wind velocities under 15 miles per hour which occur about 70% of the time in areas near the earth's surface, and at wind velocities over 15 miles per hour which occur the remaining 30% of the time.

DESCRIPTION OF FIGURES OF THE DRAWING

FIG. 1 is a rear elevational view, with parts broken away of a wind machine embodying the invention.

FIG. 2 is a fragmentary side elevational view taken on line 2—2 of FIG. 1.

FIG. 3 is a fragmentary horizontal cross sectional view taken on line 3—3 of FIG. 1.

FIG. 4 is an enlarged fragmentary vertical sectional view, with parts broken away, taken on line 4—4 of FIG. 1.

FIG. 5 is an enlarged axial sectional view of a counterbalance arm taken on line 5—5 of FIG. 1.

FIG. 6 is an exploded perspective view of parts of the counterbalance arm.

DETAILED DESCRIPTION OF THE INVENTION

Referring first to FIGS. 1, 2 and 3, there is shown a wind machine or windmill 10 having four corner beams 12 of square cross section, defining a four sided frame. Bottom ends of the beams are secured to footing plates 16 securely held in place in the ground by anchor posts 18. The beams extend upwardly and converge toward each other to form a tower. An annular plate 20 is secured to the upper ends of the beams. This plate provides a lower base or bearing surface 21 for ball bearings 22 carrying an inner annular bearing ring 24; see FIG. 4. Secured to ring 24 is a gear head or housing 26. An axially vertical hollow shaft or tube 27 is connected to gearing (not shown) in the housing 26. On top of the gear housing is secured a bearing plate 28 on which rest bearings 30 enclosed in upper annular bearing plate 32. Plate 32 provides an upper annular bearing surface 34 for the bearings 30. Extending upwardly through hole 36 in plate 32 is a short shaft 38 secured to plate 28 and carrying a horizontal tapered wind sleeve 40. Four spaced bolts 42 extend upwardly from base plate 20 and through holes in plate 32. Nuts 44 secure the assembly of bearing plates and bolts together. A shaft 46 extends horizontally from the gearing in housing 26 and carries a rotary fan 48 having a multiplicity of radially disposed blades 49. The gearing in housing 26 is that of a conventional transmission arranged so that rotational motion of rotor fan 48 on the horizontal axis of shaft 46 is converted to vertical axial reciprocating motion of shaft 27. Shaft 27 extends through a guide sleeve or collar 47 held by brace bars secured to corner beams 12.

The wider end of wind sleeve 40 turns into the wind so that the axis of the rotary blades 49 faces into the wind. As the blades turn, shaft 27 moves up and down. When the shaft is being lowered or pushed down axially, upper plate 32 provides a pushing bearing surface for shaft 27 and any load thereon as well as for the transmission gear housing 26 and gears therein. When the shaft 27 is being lifted, axially lower base plate 20 provides lifting bearing surface 21 for the weight of shaft 27 and any load which may be carried by the shaft. By the arrangement described the wind machine 10 can operate in both upward lifting and downward pushing modes cyclically as shaft 27 reciprocates.

In order to assist the motion of shaft 27 there is provided a counterbalance assembly 50 including two counterbalance arms 52 arranged to move in a diametral vertical plane of shaft 27. The arms are disposed on opposite sides of shaft 27 and extend radially outward therefrom. Shaft 27 can reciprocate axially vertically but cannot rotate. Secured to opposite sides of shaft 27 are two pairs of brackets 54. Secured by braces (not shown) to each pair of spaced side beams 12 is a rectangular, inverted U-shaped pillow 56; see FIGS. 1, 5 and 6. The pillow block has depending legs 58 which carry a bearing sleeve 60. Pins 62 axially aligned are set in sockets 63 on opposite sides of sleeve 60. The pins seat in holes 66 of legs 58 to permit the sleeve to rotate freely arcuately on a horizontal axis, while pillow block 54 remains stationary.

Axially slidable in each sleeve 60 is a tube 68. The tube terminates at its inner end in an apertured flange 70 which is pivotally secured by pin 72 to a pair of brackets 54. Disposed inside tube 68 is a threaded ring 74 carried by radial arms 75 secured to the inner wall of tube 68. Threaded hole 76 is axially aligned with the axis of tube 68. A threaded rod 78 is engaged in ring 74 and extends axially outward of the tube to terminate in external head 77. On tube 68 is a cap nut 80 having a central hole 82 through which rod 78 extends. A locknut 84 on the rod locks the rod in place in tube 68. Engaged on the rod inside tube 68 is a massive metal weight 86. The weight is cylindrical in form and has an axially threaded bore 88. The weight can be adjustably positioned along rod 78 by turning either the rod or the weight while the other is held stationary. The weight is held in desired position along the rod by locknut 90 tightened against the end of the weight. The weights 86 are easily positioned for desired counterbalancing of shaft 27 and the pushed or pulled load to be applied. With locknuts 84 loosened and cap nuts 80 disengaged from tubes 68, the assemblies of rods 78 and weights 86 can be turned until each nut 90 and weight 86 is exposed in order to change the positions of the weights. Then nut 90 can be loosened and the weight can be turned by hand or wrench while rod head 77 is held stationary. Alternatively the weight can be held stationary while rod 78 is turned. When the weights on both rods 78 are substantially equidistant from the outer ends of the rods, locknuts 90 will be tightened against the weights, and rods 78 will be inserted equal distances into tubes 68.

In operation of the wind machine system, first assume that the system is being used as a pump lifting device raising water up axially in vertical pipe 94 extending down into ground G; see FIG. 1. The counterbalance arms 52 are set so that they balance the weight of shaft 27, pump rod 95, piston 96, and part or all of the weight of water 98 carried up by the piston in pipe 94. The water spills out of lateral outlet pipe 99. The pumping takes place in the lifting mode of shaft 27, and base plate 20 bears the full weight. As tube 27 moves up the counterbalance arms 52 turn downward to the dotted line positions shown in FIG. 1. To move shaft 27 down it is necessary to overcome the upward force applied by the counterbalance arms 52. The gearing in transmission gear housing 26 now operates in the pushing mode and bearing plate 32 now resists the pushing force. It will be understood that the weights in tubes 68 need not be positioned with micrometric accuracy, since the wind machine is capable of operating in pushing as well as lifting modes. This contrasts with prior counterbalance systems where the counterbalance mechanism could only be used to balance the weight of the reciprocating pump parts and could not balance efficiently any part of the load; so that the counterbalance weights had to be precisely set to balance no more than the weight of the vertical reciprocating rod and piston.

The present invention also makes it possible to use the wind machine for other purposes than water pumping. For example, the wind machine can be used to drive an air compressor, heat pump or other machine where pushing is the principal load bearing mode, or where both pushing and pulling modes are required to drive the load or driven machine.

It will be apparent from the foregoing that in the present invention, the wind machine system has the capability to pump liquids or perform other work by converting rotary motion of the rotor to reciprocating motion of the vertical tube or shaft. The system has the capability of exerting predetermined and adjustable lifting forces and downward pushing forces on the vertical reciprocating shaft. The system has the further capability of counterbalancing a predetermined and adjustable amount of the static loads and dynamic reciprocating loads. It will be noted that the slidable arms are rigid and without any telescoping parts. The adjustable weights are separate, movably and adjustably mounted in or on the arms. The arms are directly connected to the vertical reciprocating shaft without intermediate flexible cables. The new counterbalance assembly is rigidly and mechanically secured to the vertical shaft and tower, thus eliminating and/or substantially reducing field adjustments and critical installation procedures, but permitting rapid system adjustments if needed, such as movement of counterbalance weights and movement of arms in relation to the transmission gear head or gear box for optimum timing.

It will be understood from the foregoing that heretofore windmills have been built and operated exclusively for lifting loads. Those skilled in the art have heretofore not seen the need for nor the advantages of windmills which could drive loads in both the push down and pull up modes. The present invention makes it possible to realize the potential of wind machines in a vastly broader field of applications than has heretofore been possible. A wind machine has been devised which will drive a vertical shaft carrying an external load up and down with equal maximum forces during each cycle of reciprocation of the shaft. Furthermore a more reliable counterbalancing assembly has been provided to enable continuous operation at wind velocities ranging upward from approximately 3 miles per hour so that the full potential of wind machines and windmills can be exploited.

While I have described a preferred embodiment of the invention, many modifications are possible. For example, the sliding counterbalance tubes can be replaced by splined or slotted shafts slidably carried or pivotally carried by the tower frame, and pivotably and/or slidably engaged with the opposite sides of the vertical shaft. The splined shafts will carry adjustably positionable weights. As another alternative modification the adjustable weights can be mounted on the outer sides of the counterbalance arms, without the internal rods. Other modifications will readily occur to those skilled in the art without departing from the scope and spirit of the invention as defined by the appended claims.

What is claimed is:

1. A wind machine system adapted for both lifting up and pushing down external loads, comprising:
   a stationary elevated support;
   transmission means mounted on said support and arranged for converting rotary motion to reciprocating motion;
   a multiple blade rotor driven by wind and connected to said transmission means to drive the same;
   a vertical shaft connected to said transmission means and cyclically reciprocated thereby for lifting up and pushing down said loads when said rotor rotates; and
   mounting means arranged to retain and restrain said transmission means on said support in such a way that said transmission means pushes said shaft down and pulls said shaft up with equal maximum forces during each cycle of reciprocation of said shaft.

2. A wind machine system as defined in claim 1, wherein said mounting means comprises:
   first bearings below said transmission means to resist upwardly directed lifting forces exerted through said shaft; and
   second bearings above said transmission means to resist downward pushing forces exerted through said shaft.

3. A wind machine system as defined in claim 1, further comprising:
   rigid, non-telescopic arms carried by said support at opposite sides of said shaft and engaged with said shaft so that said arms turn in vertical planes when said shaft reciprocates vertically; and
   weights carried by said arms and adjustably positionable thereon desired distances from said shaft so that predetermined and adjustable amounts of said loads are counterbalanced when said shaft reciprocates.

4. A wind machine system as defined in claim 3, further comprising means for releasably locking said weights in position on said arms.

5. A wind machine system as defined in claim 4, wherein said arms are pivotally connected at one end to opposite sides of said shaft to move with said shaft.

6. A wind machine system as defined in claim 5, further comprising means slidably supporting said arms at said support.

7. A wind machine system as defined in claim 6, wherein said arms are tubular in form to insure maximum strength thereof to resist bending forces.

8. A wind machine system as defined in claim 7, wherein said weights are movably disposed in said arms.

9. A wind machine system as defined in claim 8, further comprising rods inside said arms, said weights being movably disposed on said arms.

10. A wind machine system as defined in claim 9, wherein said mounting means comprises:
   first bearings below said transmission means to resist upwardly directed lifting forces exerted through said shaft; and
   second bearings above said transmission means to resist downward pushing forces exerted through said shaft.